Dec. 16, 1930.    J. A. CASHEL    1,785,295
AEROPLANE
Filed Aug. 6, 1929    3 Sheets-Sheet 1
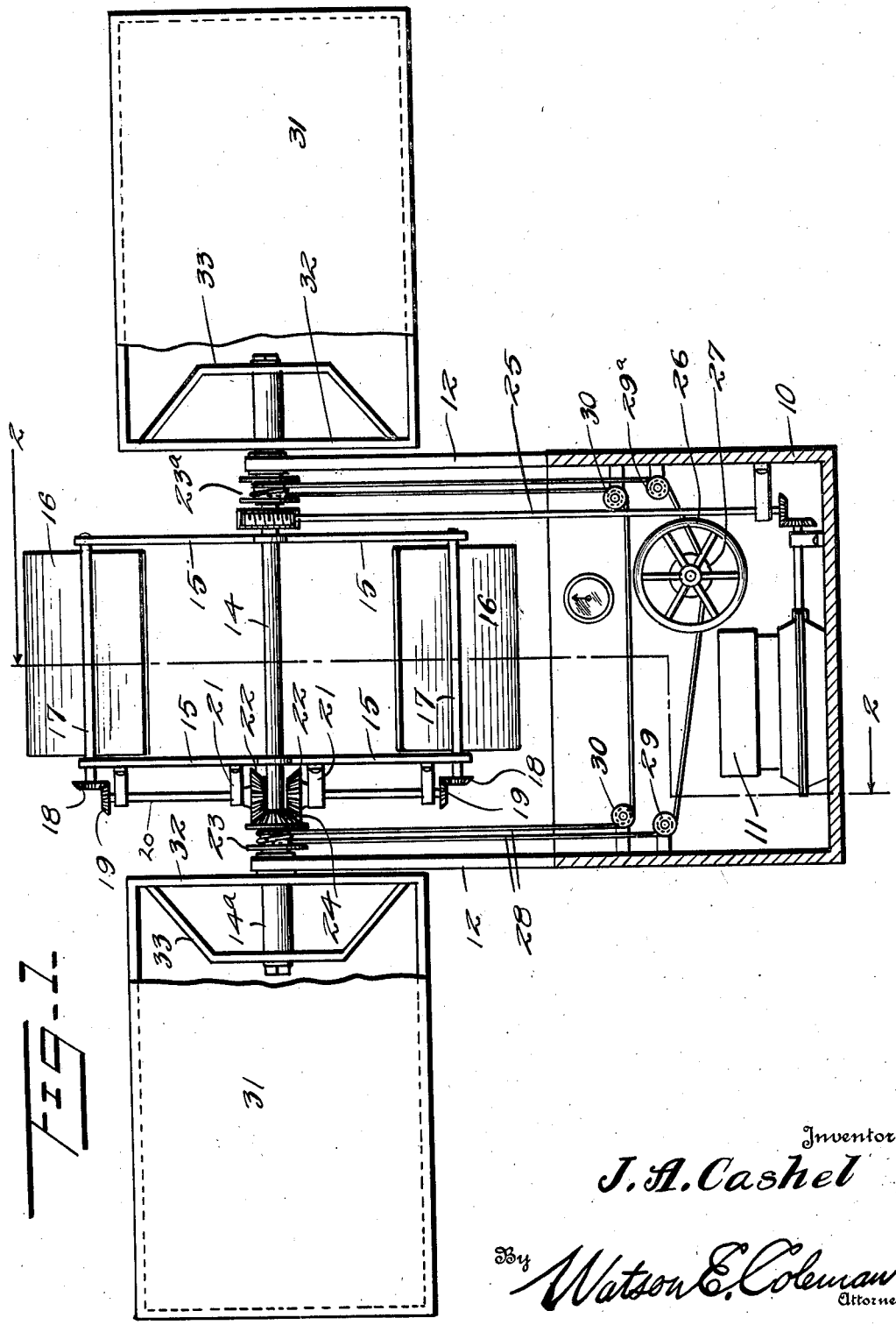
Inventor
J. A. Cashel
By Watson E. Coleman
Attorney

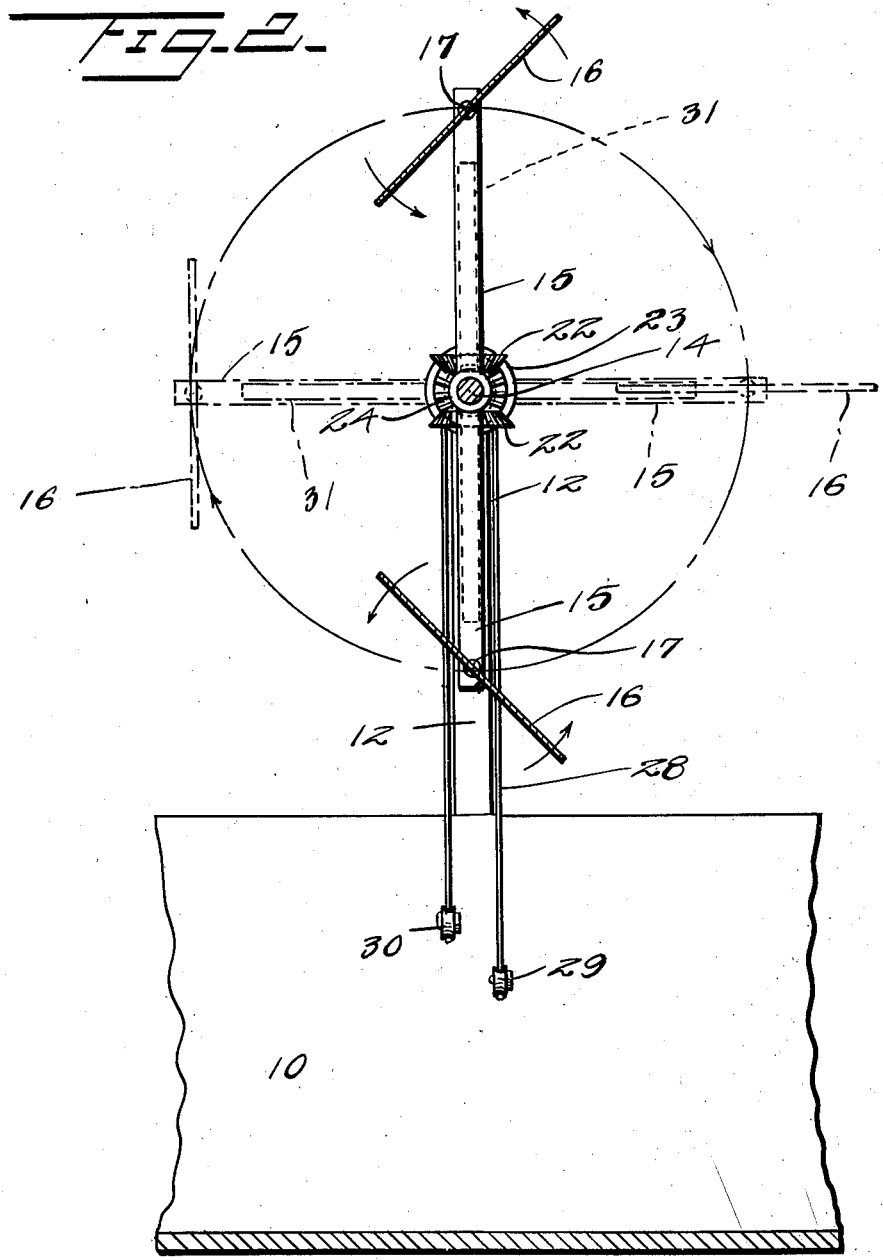

Dec. 16, 1930.   J. A. CASHEL   1,785,295
AEROPLANE
Filed Aug. 6, 1929    3 Sheets-Sheet 3
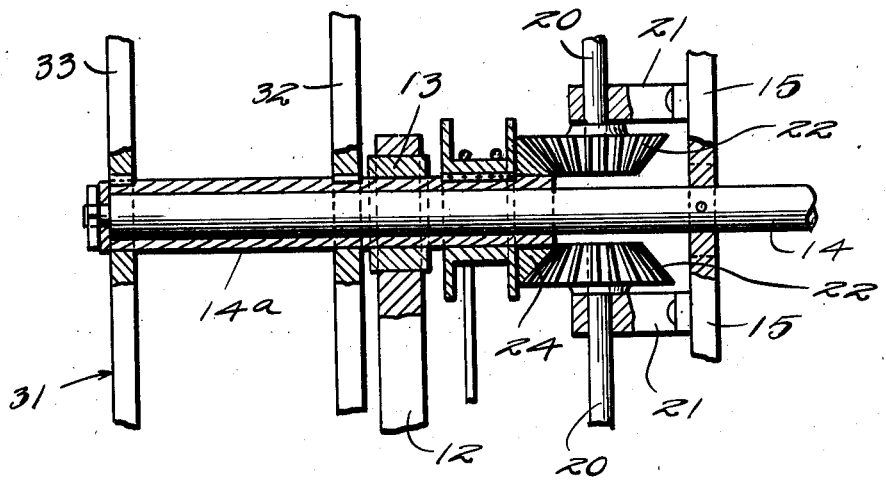
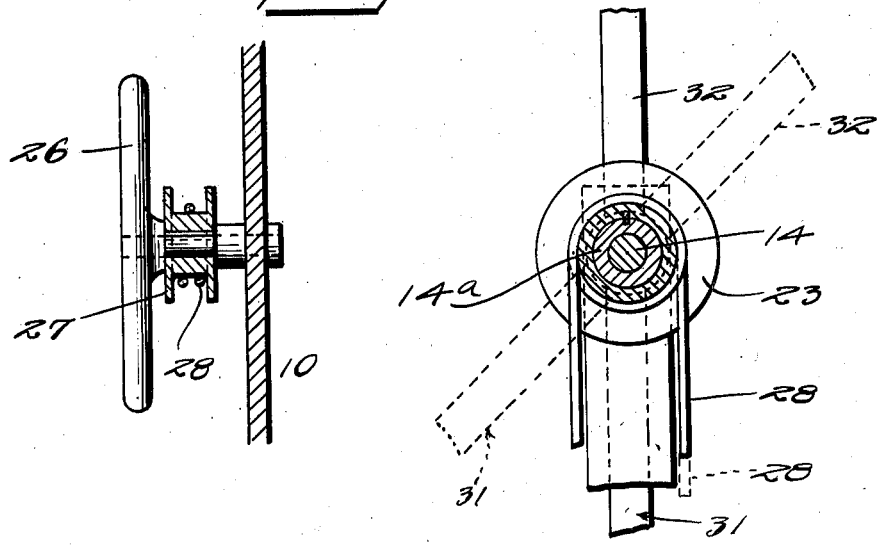
Inventor
J. A. Cashel
By Watson E. Coleman
Attorney Patented Dec. 16, 1930

1,785,295

UNITED STATES PATENT OFFICE

JOHN A. CASHEL, OF WORTHINGTON, MINNESOTA

AEROPLANE

Application filed August 6, 1929. Serial No. 383,866.

This invention relates to aeroplanes and more particularly to an aeroplane of the helicopter type.

An important object of the invention is to produce a device of this character employing a wing structure, by means of which a maximum lifting thrust may be attained.

A further object of the invention is to provide a device of this character having feathering blades and means whereby the feathering blades may be regulated during operation thereof to vary the direction of thrust provided, so that the direction of movement of the machine may be controlled.

A further object of the invention is to produce a device of this character wherein the control mechanism for the feathering blades likewise serves to control wing surfaces and to maintain these wing surfaces in the general direction of the line of flight.

These and other objects I attain by the construction shown in the accompanying drawings, wherein for the purpose of illustration is shown a preferred embodiment of my invention and wherein:—

Figure 1 is a vertical sectional view through an aeroplane constructed in accordance with my invention;

Figure 2 is a section on the line 2—2 of Figure 1;

Figure 3 is an enlarged detail sectional view showing the mounting of the control drum and gear;

Figure 4 is a detail sectional view showing the manner in which the drum control apparatus is mounted;

Figure 5 is a section through the drum and the sleeve upon which it is mounted.

Referring now more particularly to the drawings, the numeral 10 generally designates a fuselage and motor compartment within which is arranged a motor 11 of any suitable type. Arising from the fuselage are spaced standards 12, which align transversely of the fuselage and are provided at their upper ends with bearings 13 for a shaft 14. Upon this shaft between the bearings 13 are centrally secured diametrically extending arms 15, between the outer ends of which propeller blades 16 are pivoted.

Each propeller blade is mounted upon a shaft 17 rotatably engaged in the ends of the arms and the outer end of this shaft has secured thereto a bevel gear 18 meshing with a bevel gear 19 carried by the shaft 20 rotatably supported from the adjacent arm 15, as at 21. This shaft extends adjacent the drive shaft 14 and has at its inner end a bevel gear 22. Rotatably mounted upon the shaft 14 is a sleeve 14a to which is secured a drum 23 having a grooved periphery and having secured thereto a pinion 24, which meshes with the gears 22 at the inner ends of the shafts 20. This pinion is of one-half the size of the gears 22 and is held stationary during the rotation of the shaft in a manner hereinafter described, with the result that as the arms rotate with the shaft and for each two rotations of the shaft, the shafts 20 will be caused to make one complete revolution. This rotation is imparted to the blades 16. The shaft 13 is connected with the motor 11, as at 25, to be driven thereby.

Within the cockpit of the fuselage 10 is arranged a control wheel 26, by means of which a drum 27 may be rotated. The flexible element 28 is trained about this drum over suitable guide pulleys 29 about the grooved drum 23, which is arranged between one side of the propeller structure and the adjacent bearing. From this drum, it is passed over guide pulleys 30 to a second drum 23a similar to the drum 23, but arranged at opposite sides of the propeller structure and having no gear 24. From the drum 23a, the flexible element is returned over a guide pulley 29a to the drum 27.

Wing structures, generally designated at 31, are rotatably mounted upon the ends of the shaft 14, each wing structure including a bar 32 centrally rotatably engaging the shaft 14 adjacent the drum 23 or 23a and a second bar 33 rotatably engaging the shaft 14 outwardly of the bearing 13 and which is braced to the first named bar 32. Each bar 32 is secured to its adjacent drum 23 or 23a in such manner that when the propeller blades 16 are operating to impel the machine in a given direction, the wing structure extends in this direction. If the machine is moving vertically, the wing structures are vertically disposed and if the machine is moving horizontally, the wing structures are horizontally disposed.

It will be noted that in operation, for each rotation of the shaft 14, each blade 16 will be rotated through 180°. With this operation at all times during the rotation of the shaft 14, each blade will, during one instant of its rotation, be disposed with a flat face radial to the shaft 14 and during the one-half rotation of which this instant is a part, will have its flat face lying between angles at 45° to the radius. When at a point diametrically opposed to that at which it is radial to the shaft 14, will be perpendicular to this shaft and arranged as nearly as possible in the general path of rotation of the blades. As a matter of fact, a blade nearly straight will more closely approximate the actual path of the blade, as the propeller blade, when in the first named position, will cause movement of the machine in a direction perpendicular to the flat surface and accordingly in the general direction in which this flat surface is arranged, when it arrives at the last named position. It will, of course, be obvious that by rotation of the drum 27 to vary the position of the gear 23 with relation to a fixed point, the point at which the blades 16 have their flat surfaces radial to the shaft 14 may be regulated, so that the blades may be made to exercise their force either vertically or horizontally in either direction. Since the wings 31 are so secured to the drums 23 that they always occupy a position at right angles to the general plane of the blade, which is radial to the shaft, these wings will at no time offer resistance to the movement of the machine. It will, of course, be understood that the fuselage wing structures and the like will be suitably braced and will be provided with the usual rudders and other necessary accessories.

Since certain changes are possible in the construction hereinbefore set forth without materially departing from the spirit of the invention, I do not limit myself to such specific structure except as hereinafter claimed.

I claim:—

1. In an aeroplane, a driven shaft, a plurality of pairs of spaced arms secured thereto, a blade rotatable between the outer ends of each pair of arms, a drum rotatably mounted upon the shaft and a connection between each blade and said drum whereby each blade is rotated once for each two rotations of the shaft, each blade at a corresponding point with relation to the shaft being radial to the shaft and a pair of wings mounted on said driven-shaft and connected to said drum and adapted to be adjustably rotated therewith.

2. In an aeroplane, a driven shaft, a plurality of pairs of spaced arms secured thereto, a blade rotatable between the outer ends of each pair of arms, a drum rotatably mounted upon the shaft, a connection between each blade and said drum whereby each blade is rotated once for each two rotations of the shaft, each blade at a corresponding point with relation to the shaft being radial to the shaft and means for oscillatably adjusting the drum to vary the position at which said blades are radial to the shaft and a pair of wings mounted on said driven shaft and connected to said drum and adapted to be adjustably rotated therewith.

3. In an aeroplane, a driven shaft, a plurality of pairs of spaced arms secured thereto, a blade rotatable between the outer ends of each pair of arms, a drum rotatably mounted upon the shaft, a connection between each blade and said drum whereby each blade is rotated once for each two rotations of the shaft, each blade at a corresponding point with relation to the shaft being radial to the shaft and wing structures secured to said drums and maintained thereby perpendicular to the blades when said blades are at the point where they are radial to said shaft and a pair of wings mounted on said driven shaft and connected to said drum and adapted to be adjustably rotated therewith.

4. In an aeroplane, a wing structure, a driven shaft, a plurality of pairs of spaced arms secured to the shaft, a blade rotatable between each pair of arms, means for rotating said blades during rotation of the shaft whereby each blade is radial to the shaft at only one point in each rotation of the arms about the shaft and whereby the blades when radial to the shaft are perpendicular to said wing structure and means for adjusting said blades and said wing structure whereby to change their angular position with respect to the fuselage.

5. In an aeroplane, a driven shaft, a plurality of pairs of spaced arms secured thereto, a blade rotatable between each pair of arms, a drum rotatably mounted upon the shaft, a gear carried thereby, a shaft rotatably supported by an arm of each pair, gearing connecting said shaft with the blade of the associated arm, a gear upon the inner end of the shaft meshing with the gear of the drum, means for rotatably adjusting the drum upon the shaft and a pair of wings mounted on said driven shaft and connected to said drum and adapted to be adjustably rotated therewith.

6. In an aeroplane, a driven shaft, a plurality of pairs of spaced arms secured thereto, a blade rotatable between each pair of arms, a drum rotatably mounted upon the shaft, a gear carried thereby, a shaft rotatably supported by an arm of each pair, gearing connecting said shaft with the blade of the associated arm, a gear upon the inner end of the shaft meshing with the gear of the drum and a wing structure secured to each drum and rotatably mounted on said shaft.

In testimony whereof I hereunto affix my signature.

JOHN A. CASHEL.